(12) United States Patent
Kwon

(10) Patent No.: US 7,072,748 B2
(45) Date of Patent: Jul. 4, 2006

(54) METHOD FOR DIAGNOSING A FAILURE OF AN OUTPUT SHAFT SPEED SENSOR OF AN AUTOMATIC TRANSMISSION FOR A VEHICLE

(75) Inventor: Hyuk-Bin Kwon, Gunpo (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 10/330,428

(22) Filed: Dec. 27, 2002

(65) Prior Publication Data
US 2003/0171861 A1 Sep. 11, 2003

(30) Foreign Application Priority Data
Mar. 11, 2002 (KR) .......................... 2002-12940

(51) Int. Cl.
*G06F 19/00* (2006.01)

(52) U.S. Cl. ............................. 701/34; 701/51; 180/337
(58) Field of Classification Search .................. None
See application file for complete search history.

(56) References Cited
U.S. PATENT DOCUMENTS 5,682,792 A * 11/1997 Liesener et al. ............... 74/335
6,223,113 B1 * 4/2001 McCunn et al. ............... 701/62
6,240,365 B1 * 5/2001 Bunn ............................ 701/213

FOREIGN PATENT DOCUMENTS

| DE | 19548432 A1 | 7/1996 |
| JP | 59-133855 | 8/1984 |
| JP | 62-004948 | 1/1987 |
| JP | 02-089857 | 3/1990 |
| JP | 03-219165 | 9/1991 |
| JP | 10-205614 | 8/1998 |
| JP | 11-280883 | 10/1999 |
| JP | 2001-330144 | 11/2001 |

* cited by examiner

*Primary Examiner*—Olga Hernandez
(74) *Attorney, Agent, or Firm*—Morgan Lewis & Bockius LLP

(57) ABSTRACT

A method and apparatus for diagnosing a failure of an output shaft speed sensor of an automatic transmission is provided, which comprises: determining whether a current transmission is a forward driving range; determining whether a failure criterion exists based on a current gear, an input shaft speed, an output shaft speed, and an engine speed, if the current transmission is the forward driving range; and maintaining the current gear if a downshift criterion exists, or upshifting a gear if a upshift criterion exists, if the failure criterion exists.

29 Claims, 4 Drawing Sheets

METHOD FOR DIAGNOSING A FAILURE OF AN OUTPUT SHAFT SPEED SENSOR OF AN AUTOMATIC TRANSMISSION FOR A VEHICLE

FIELD OF THE INVENTION

The present invention relates to automatic transmissions and, more particularly, to a method for diagnosing the failure of an output shaft speed sensor in the automatic transmission of a vehicle.

BACKGROUND OF THE INVENTION

Generally, an automatic transmission for a vehicle includes a Transmission Control Unit (TCU) that automatically regulates a gear ratio according to various driving conditions such as vehicle speed and engine load. The TCU regulates the output shaft speed of a planetary gear set by controlling the operation of the clutches and brakes within the gear train. To regulate the output shaft speed, the TCU receives signals representative of vehicle driving parameters and determines a solenoid valve duty control signal according to a predetermined program. The solenoid valve regulates hydraulic pressure supplied to the clutches and brakes and is operated according to the solenoid valve duty control signal.

The TCU determines whether the output shaft speed sensor has failed or not based on the output shaft speed signal. For example, the TCU concludes the output shaft speed sensor has failed if a difference between the output shaft speed signal and the vehicle speed signal is above 30% of the output shaft speed signal. If the output shaft speed sensor has failed, the TCU does not allow the transmission to shift to a target gear, holds the gear in second gear or third gear, and displays an engine inspection lamp instructing the driver to seek maintenance for the failed part. But it is impossible to diagnose the output shaft speed sensor if the engine speed sensor is removed. Furthermore, it is possible to incorrectly determine the output shaft speed sensor has failed when the engine speed sensor has interference.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention, a method for diagnosing a failure of an output shaft speed sensor of an automatic transmission comprises: determining whether the transmission is in a forward gear; determining whether a failure criterion exists based on at least one of a current gear, an input shaft speed, an output shaft speed, or an engine speed, if the transmission is in a forward gear; and maintaining the current gear if a downshift criterion exists, or upshifting a gear if a upshift criterion exists, if the failure criterion exists.

If the forward gear is first gear or second gear, the failure criterion preferably comprises at least one of: (1) a lapse of a predetermined period after shifting from neutral to drive and a turbine shaft speed greater than a turbine shaft speed threshold and no signal from the output shaft speed sensor; or (2) a lapse of a predetermined period after shifting from neutral to drive and an engine speed greater than a engine speed threshold and a normal engine speed sensor signal and no signal from the output shaft speed sensor. Preferably, the engine speed threshold is greater than an engine stall speed in first gear.

If the transmission is in third gear, fourth gear, or fifth gear, the failure criterion preferably comprises at least one of: (1) completion of shifting from neutral to drive, and a turbine shaft speed greater than a turbine shaft speed threshold, and no signal from the output shaft speed sensor; or (2) completion of shifting from neutral to drive, and an engine speed greater than an engine speed threshold, and a normal engine speed sensor signal, and no signal from the output shaft speed sensor, wherein the engine speed threshold is preferably less than an engine stall speed in first gear.

In a preferred embodiment, the upshift criterion comprises at least one of: (1) an engine speed greater than an engine speed threshold, and an angular acceleration of the engine greater than 0; or (2) a turbine shaft speed greater than a turbine shaft speed threshold, and an angular acceleration of the turbine shaft greater than 0.

Preferably, the method further comprises a shift restriction control comprising: determining whether a shift restriction criterion exists; determining whether the transmission is in a forward gear, if it is determined that the shift restriction criterion exists; and maintaining a current gear if a downshift criterion exists, or upshifting a gear if a upshift criterion exists, for a shift restriction period, if the transmission is in a forward gear. Preferably, the shift restriction criterion comprises that a turbine shaft speed is higher than a turbine shaft speed threshold, and an angular acceleration of the output shaft is less than a angular acceleration threshold. And preferably, the shift restriction criterion further comprises that a current shift mode is neither an extremely low temperature mode nor a fail-safe mode and that the shift restriction control further comprises shifting a transmission into third gear if a neutral gear or a parking gear is detected during the shift restriction period.

In a preferred embodiment of the invention, the shift restriction control further comprises: determining whether the transmission is neutral or park, if it is determined that the transmission is not in a forward gear; and shifting the transmission into a third gear of a neutral range, if the current gear is neutral or park. Preferably, the shift restriction control further comprises shifting the transmission into third gear if the transmission is shifted into a forward gear.

In a preferred embodiment of the invention, the upshift criterion of the shift restriction control comprises: (1) an engine speed greater than an engine speed threshold and an angular acceleration of the engine greater than 0; and (2) a turbine shaft speed greater than a turbine shaft speed threshold, and an angular acceleration of the turbine shaft greater than 0. Preferably, if shifting is in progress when the shift restriction criterion exists, the shift restriction period starts after the completion of the progressing shift.

In a further preferred embodiment of the present invention, a system for diagnosing a failure of an output shaft speed sensor of an automatic transmission comprises: an inhibitor switch for detecting what gear the transmission is in; an input shaft speed sensor detecting a turbine shaft speed and generating a corresponding signal; an output shaft speed sensor detecting an output shaft speed and generating a corresponding signal; an engine speed sensor detecting an engine speed and generating a corresponding signal; and a control unit programmed to execute instructions comprising: determining whether the transmission is in a forward gear; determining whether a failure criterion exists based on a current gear, an input shaft speed, an output shaft speed, and an engine speed, if the transmission is in a forward gear; and maintaining the current gear if a downshift criterion exists, or upshifting a gear if a upshift criterion exists, if the failure criterion exists.

A method for diagnosing a failure of an output shaft speed sensor of an automatic transmission according to a further embodiment of the present invention comprises: determining whether the transmission is in a forward gear; determining whether a failure criterion exists based on the forward gear, an input shaft speed, and an output shaft speed; and determining that the output shaft speed sensor has failed based on the failure criterion existing.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

Like numerals refer to similar elements throughout the several drawings.

DETAILED DESCRIPTION OF THE PREFERRED EMBODIMENTS

Figure 4:
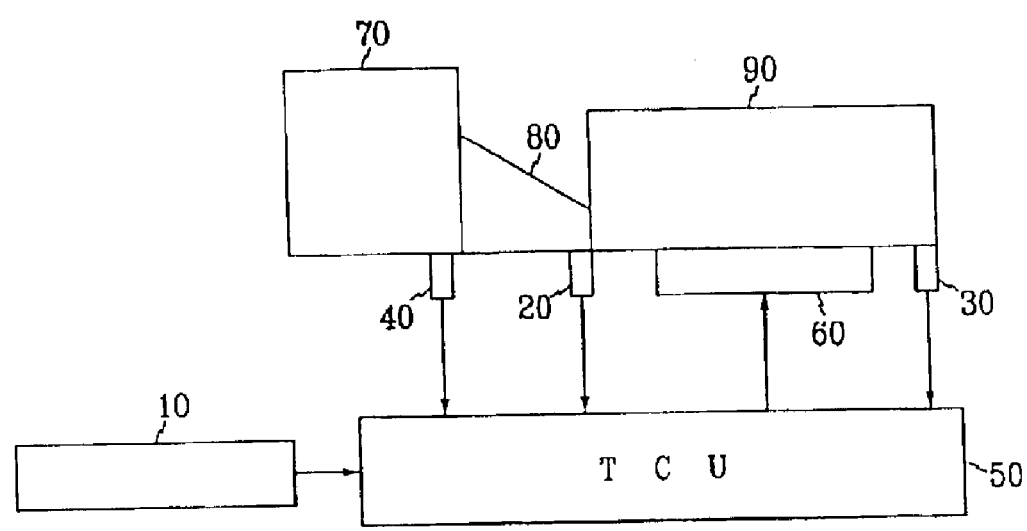
FIG. 4 is a block diagram of a failure diagnosis system for an output shaft speed sensor of an automatic transmission according to a preferred embodiment of the present invention.

As shown in FIG. 4, a system for diagnosing the failure of an output shaft speed sensor of an automatic transmission for a vehicle according to a preferred embodiment of the present invention includes an inhibitor switch 10, an input shaft speed sensor (PG-A sensor) 20, an output shaft speed sensor (PG-B sensor) 30, an engine speed sensor 40, and a transmission control unit (TCU) 50.

The inhibitor switch 10 is a device for detecting the position of a shift lever and outputting a corresponding electrical signal. The input shaft speed sensor 20 detects the speed of a turbine shaft of a torque converter 80, and outputs a corresponding signal. The turbine shaft is connected to the input shaft of an automatic transmission 90. The output shaft speed sensor 30 detects the output shaft speed of the automatic transmission, and outputs a corresponding electrical signal. The engine speed sensor 40 detects the speed of the crankshaft of an engine 70, which varies according to the engine speed, and outputs a corresponding electrical signal. The TCU 50 receives the signals from the above switch and sensors, and determines the operating state of the output shaft speed sensor 30. If the output shaft speed sensor 30 has failed, the TCU 50 outputs a failure signal and a shift control signal to a hydraulic pressure control element 60. An automatic transmission uses changes in hydraulic pressure to change gears. The TCU 50 preferably includes a processor, a memory, and other necessary hardware and software components, as will be understood by persons skilled in the art, to permit the TCU to communicate with sensors and execute the failure determining method as described herein.

Figure 1:
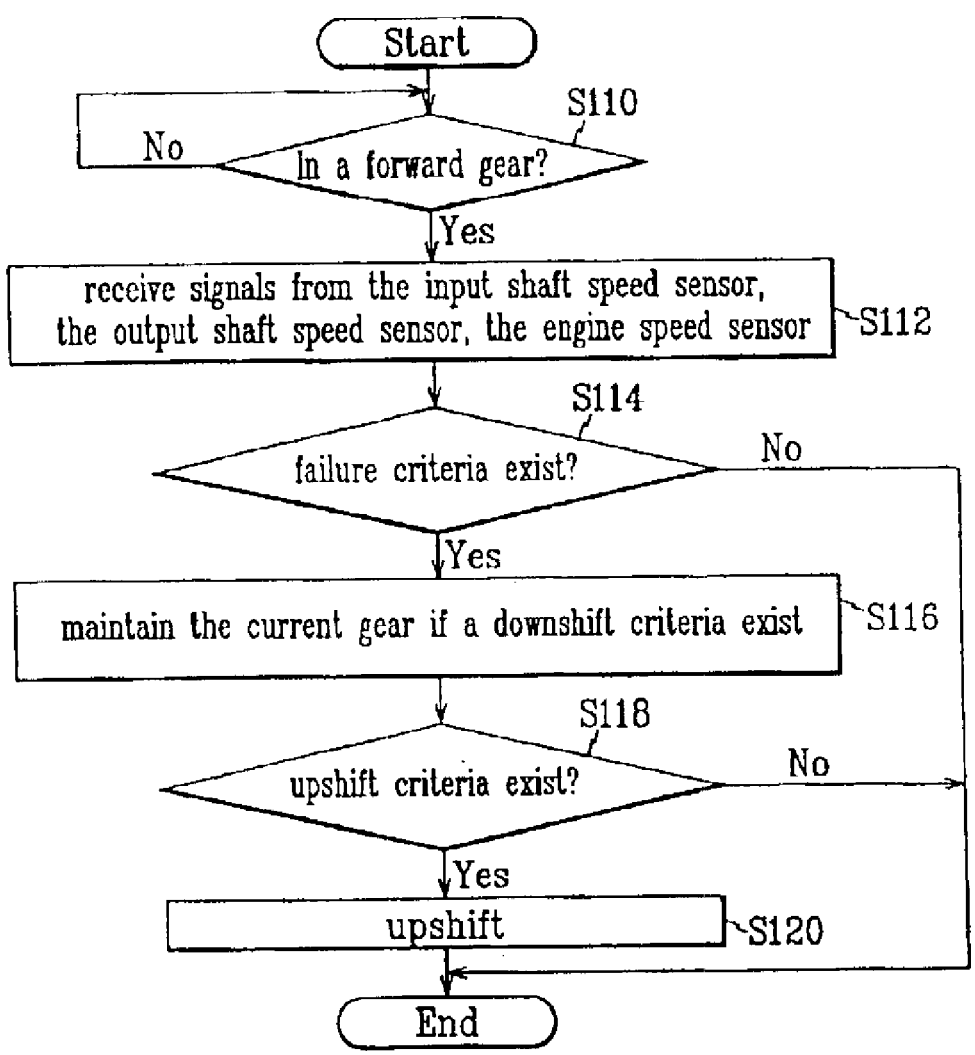
FIG. 1 is a flow chart of a failure diagnosis method for an output shaft speed sensor of an automatic transmission according to a preferred embodiment of the present invention.
Figure 2:
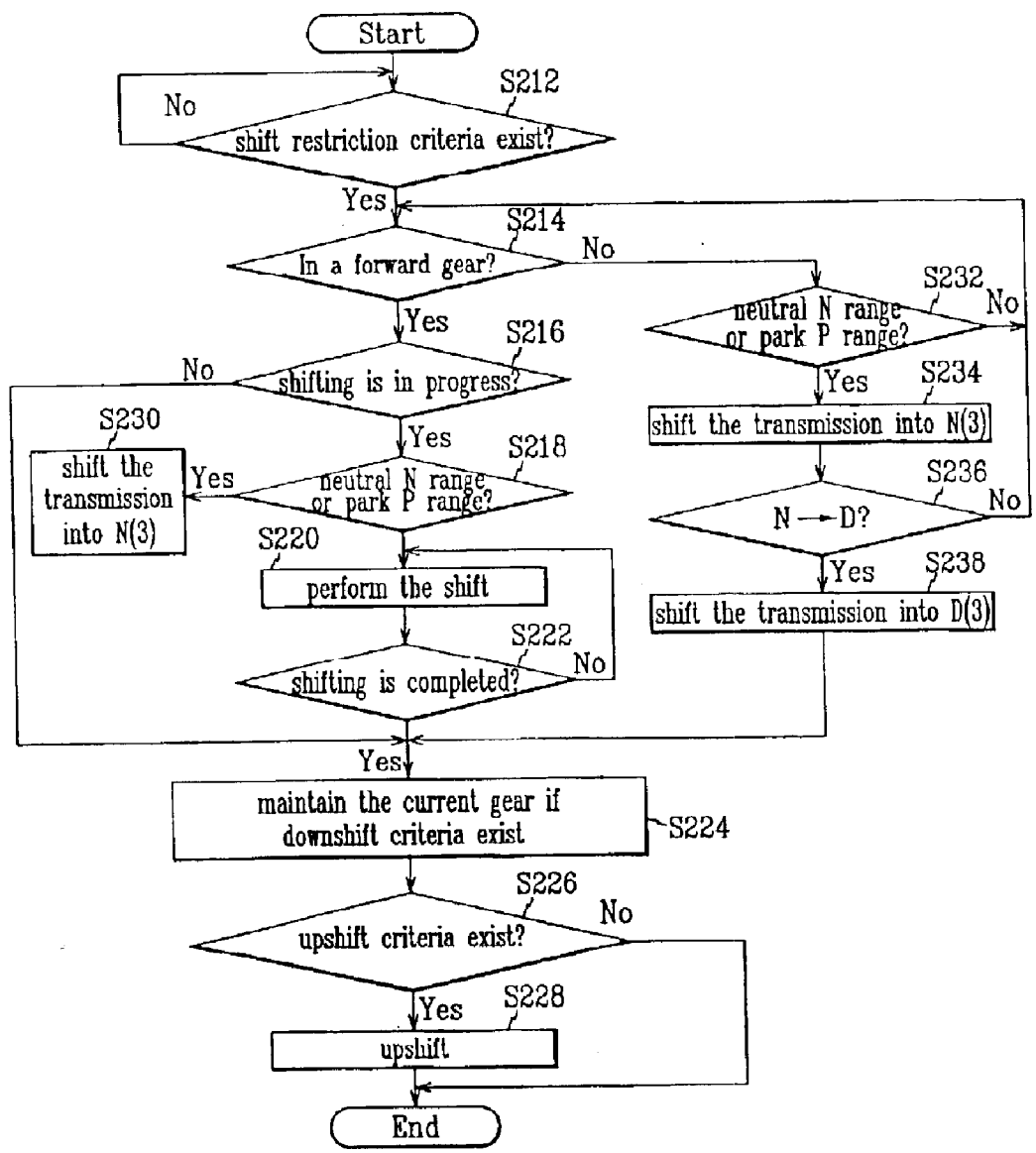
FIG. 2 is a flow chart of a shift restriction method according to a preferred embodiment of the present invention.
Figure 3:
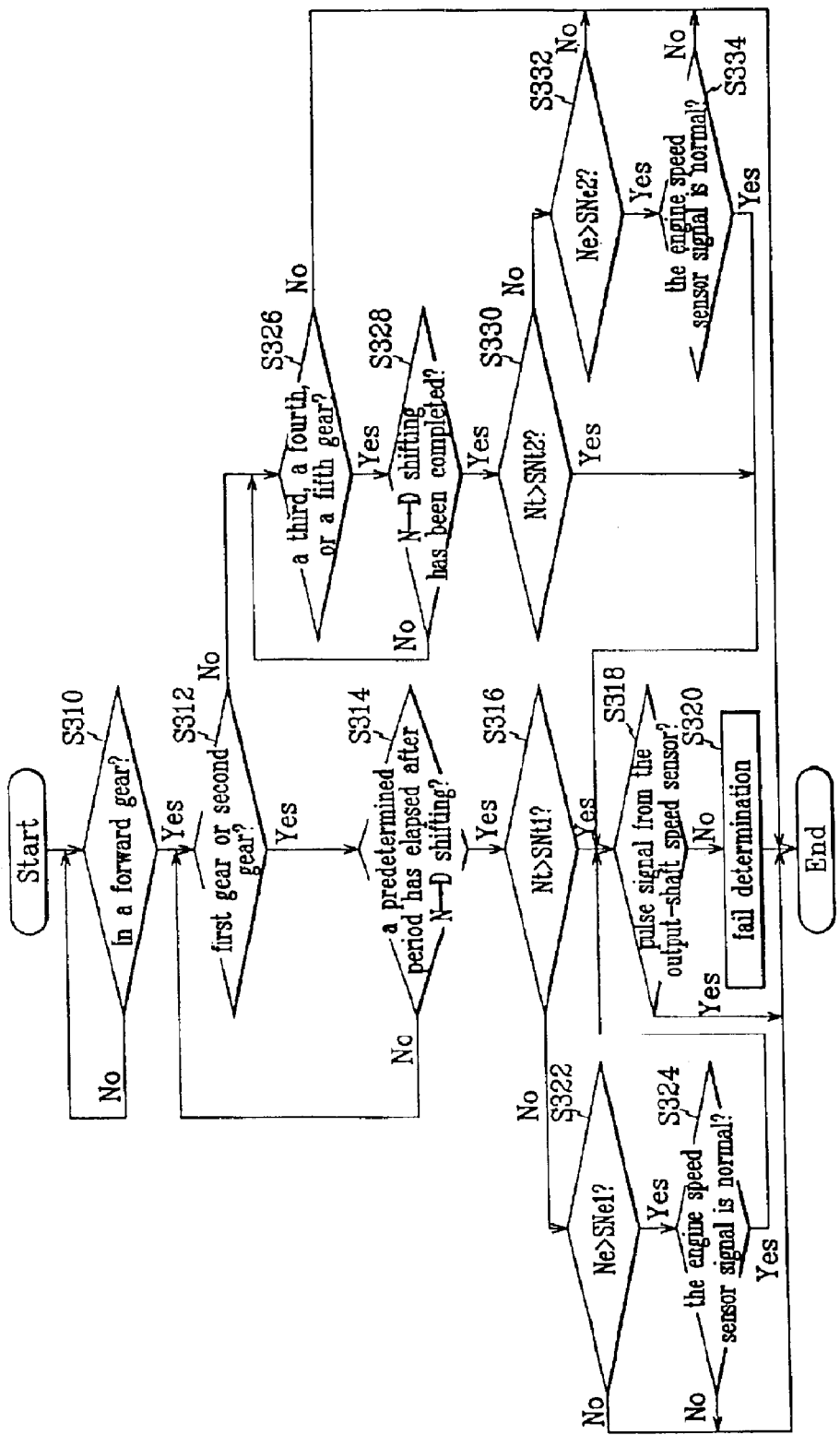
FIG. 3 is a flow chart of a failure determining method according to a preferred embodiment of the present invention.

With the above structure, a preferred embodiment of a method of the present invention determines whether the output shaft speed sensor has failed and controls a shift operation in response, as shown in FIGS. 1 to 3. Now referring to FIG. 1, in step S110 the TCU 50 determines if the current gear is one of the forward gears. If so, in step S112, the TCU 50 receives signals from the input shaft speed sensor 20, the output shaft speed sensor 30, and the engine speed sensor 40. In step S114, TCU 50 performs a diagnosis of the output shaft speed sensor 30 according to the current gear, as discussed within in greater detail with reference to FIG. 3.

Continuing with FIG. 1, if in step S114 it is determined that the output shaft speed sensor has failed, the TCU 50 performs a shift control routine as described in steps S114 to S120. That is, if a downshift criterion exists, in step S116 the TCU 50 maintains the current gear without downshifting, and if an upshift criterion exists in step S118, then in step S120 the TCU 50 upshifts the transmission one gear higher. The step S116 is discussed in detail with respect to FIG. 2, below. The downshift criterion is a general downshift condition for an automatic transmission known to one of ordinary skill in the art.

Continuing with FIG. 1, the upshift criterion is either of: (1) the engine speed (Ne) is higher than an engine speed threshold (for example, 5800 rpm) and the angular acceleration of the engine is greater than 0 (that is, $dNe/dt>0$), or (2) the turbine shaft speed (Nt) is higher than a turbine shaft speed threshold (for example, 5800 rpm) and the angular acceleration of a turbine shaft is greater than 0 (that is, $dNt/dt>0$). If at least one of (1) and (2) exists, the upshift criterion exists.

The failure determining method according to a preferred embodiment of the present invention further comprises the shift restriction method of FIG. 2, which may be simultaneously performed with the failure determining steps of FIGS. 1 and 3. Initially, as shown in FIG. 2, in step S212 the TCU 50 determines whether a shift restriction criterion exists. This shift restriction criterion includes both: (1) the turbine shaft speed (Nt) is higher than a turbine shaft speed threshold (for example, 500 rpm), and (2) the angular acceleration of the output shaft is less than an angular acceleration threshold (for example, $-19$ rev/sec$^2$).

These conditions are governed by vehicle dynamics. When a vehicle is decelerated, the deceleration has a physical limit, and therefore the angular acceleration of the output shaft of the automatic transmission has also a limit. The angular acceleration threshold is preferably chosen as the physical limit of the angular acceleration of the output shaft. If the angular acceleration of the output shaft is less than the angular acceleration threshold when the turbine shaft speed is higher than the turbine shaft speed threshold, it is determined that the output shaft speed sensor has failed.

The shift restriction criterion further includes the condition that the current shift mode is neither an extremely low temperature mode nor a fail-safe mode. The extremely low temperature mode is a shift mode wherein the transmission is held at a specific gear (for example, second gear) if the temperature is lower than a temperature threshold (for example, $-29$ degrees Celsius). The fail-safe mode is a shift mode wherein the transmission is held at a specific gear (for example, third gear). Because the transmission is held at specific gears in the extremely low temperature mode or the fail-safe mode, it is not necessary to perform a shift restriction under these conditions. Therefore, it is preferable that the shift restriction is performed when the shift mode is neither of these two modes.

If it is determined that the shift restriction criterion exists, in step S214 the TCU 50 determines whether the transmission is in a forward gear. The forward gear may include a driving D gear, a third gear (3) range, a second gear (2) range, a first gear (1) range (or a low gear (L)), and it may further include a sport (SP) mode in a transmission that is provided with a sport mode.

If in step S214 it is determined that the current gear is a forward gear, the TCU 50 performs a predetermined shift restriction control for a shift restriction period (for example, 1 second). In step S216, the TCU 50 determines whether shifting is in progress and, if so, the TCU 50 controls to complete the progressing shift, according to the following steps. In step S218, during the predetermined shift restriction period, the TCU 50 determines whether the transmission is shifting to neutral (N) or park (P) from the forward gear. If so, in step S230 the TCU 50 shifts the gear to N(3), where N(3) designates a third gear in the neutral N range. The TCU 50 then terminates the shift restriction period. If not, in step S220 the TCU 50 performs the shift. Then, in step S222 the TCU 50 determines whether the shift has been completed, and if it has, the TCU 50 performs the shift restriction control in steps S224 to S228 for the shift restriction period (for example, one second).

The shift restriction control is identical to the shift control of FIG. 1 and mirrors steps S116 to S120. That is, in step S224 the TCU 50 controls to maintain a current gear without downshifting if a downshift criterion exists. Then, in step S226 the TCU 50 determines whether the upshift criterion exists. If so, in step S228 the TCU 50 upshifts the transmission one gear higher.

Returning to step S214, if the transmission is not in a forward gear, and if, in step S232, the transmission is in neutral (N) or park (P), then in step S234 the TCU 50 controls to shift the transmission into N(3). In step S236 the TCU 50 determines whether neutral to drive (N D) shifting occurs. If so, in step S238 the TCU 50 controls to shift the transmission into range D(3), which designates the third gear of the driving (D) range. When the N D(3) shifting is completed, the TCU 50 performs the shift restriction control of steps S224 to S228, discussed above, for the predetermined shift restriction time (for example, one second).

Referring to FIG. 3, the output shaft speed sensor failure determining method is based on signals from the input shaft speed sensor 20, the output shaft speed sensor 30, and the engine speed sensor 40. The output shaft diagnosis of FIG. 3 mirrors steps S110 to S114 of FIG. 1. In step S310, the TCU 50 determines whether the transmission is in a forward gear. If so, in step S312 the TCU 50 determines whether the current gear is first gear (including range L) or second gear. If in step S312 it is determined that the current gear is first gear or the second gear, then in steps S314 to S320 the TCU 50 determines whether failure criterion exists.

When the current gear is first gear or second gear, the failure criterion conditions are: (1) the determination is within a predetermined period (for example, 3 seconds) from shifting from neutral to drive, and the turbine shaft speed (the input shaft speed) (Nt) is greater than a turbine shaft speed threshold (SNt1) (for example, 700 RPM), and there is no pulse signal from the output shaft speed sensor 30; or (2) the determination is within a predetermined period (for example, 3 seconds) from shifting from neutral to drive, and the engine speed (Ne) is greater than an engine speed threshold (SNe1) (for example, 3000 RPM), and the output of the engine speed sensor signal is normal, and there is no pulse signal from the output shaft speed sensor 30.

If at least one of the two criterion exists when the gear is first gear or second gear, the TCU 50 determines that the output shaft speed sensor 30 has failed, and generates a corresponding failure signal. The predetermined period after shifting from neutral to drive is preferably the period needed for engaging gears when shifting from neutral to drive during cold temperatures.

If the turbine shaft speed is approximately 700 RPM and the gear is first gear or second gear, the output shaft of the transmission can be assumed to be rotating. Therefore, if there is no pulse signal from the output shaft speed sensor under criterion (1), this indicates that the output shaft speed sensor 30 has failed. Similarly, if the engine speed is approximately 3000 RPM and the gear is first gear or second gear, the output shaft of the transmission can be assumed to be rotating. Therefore, if there is no pulse signal from the output shaft speed sensor under the criterion (2), this indicates that the output shaft speed sensor 30 has failed. Furthermore, in criterion (2), the predetermined engine speed (3000 RPM) is determined based on the engine stall speed. An engine stall test is generally performed in first gear, and the engine stall speed typically is about 2700~2800 RPM. If the engine speed is higher than the engine stall speed in first gear, the output shaft of the transmission is assumed to be rotating. The engine speed threshold is chosen to be higher than the engine stall speed in first gear, so if there is no pulse signal from the output shaft speed sensor under criterion (2), this indicates that the output shaft speed sensor 30 has failed.

In criterion (2), the function of the engine speed sensor signal may is diagnosed by a separate control logic, and such control logic will be apparent to a person of ordinary skill in the art. To determine whether the failure criterion exists, after determining in step S312 that the gear is first gear or second gear, the TCU 50, in step S314, determines whether the predetermined period has elapsed after shifting from neutral to drive. If so, the TCU 50 determines in step S316 whether the current turbine shaft speed (Nt) is higher than the turbine shaft speed threshold (SNt1). If so, in step S318 the TCU 50 determines whether there is a pulse signal from the output shaft speed sensor. If there is no pulse signal from the output shaft speed sensor, that is, the output shaft speed is 0, it is determined in step S320 that the output shaft speed sensor has failed, and the TCU 50 generates a corresponding failure signal.

Returning to step S316, if the turbine shaft speed is not higher than the turbine shaft speed threshold, in step S322 the TCU 50 determines whether the engine speed (Ne) is higher than the predetermined engine speed threshold (SNe1). If so, in step S324 the TCU 50 determines whether the engine speed signal is normal. If so, then in step S318, if it is determined that there is no pulse signal from the output shaft speed sensor, in step S320 it is concluded that the output shaft speed sensor has failed and the TCU 50 generates a corresponding failure signal in step S320. If, in step S312, it is determined that the current gear is neither first gear nor second gear, then in step S326 TCU 50 determines whether the current gear is third gear, fourth gear, or fifth gear. If so, in step S328 the TCU 50 determines whether shifting from neutral to drive has been completed.

When the current gear is third gear, fourth gear, or fifth gear, the failure criteria are:

(1) after neutral to drive shifting has completed and a turbine shaft speed (an input shaft speed) (Nt) is greater than a turbine shaft speed threshold (SNt2) (for example, 700 RPM) and there is no pulse signal from the output shaft speed sensor 30; or (2) neutral to drive shifting has completed and an engine speed (Ne) is greater than an engine speed threshold (SNe2) (for example, 2000 RPM) and the engine speed sensor is operating normally and there is no pulse signal from the output shaft speed sensor 30. If at least one of the two criterion exists when the gear is third gear, fourth gear, or fifth gear, the TCU 50 determines that the output shaft speed sensor 30 has failed and generates a corresponding failure signal. The conditions are incorporated into the method as follows.

In step S330, after shifting from neutral to drive has been completed, the TCU 50 determines whether the turbine shaft speed (Nt) is higher than the turbine shaft speed threshold (SNt2). If so, in step S318 the TCU 50 determines whether there is a pulse signal from the output shaft speed sensor. If not, it is concluded, in step S320, that the output shaft speed sensor has failed and the TCU 50 generates a corresponding failure signal.

Returning to step S330, if the turbine shaft speed is not higher than the turbine shaft speed threshold, in step S332, the TCU 50 determines whether the engine speed (Ne) is higher than the engine speed threshold (SNe2). If the engine speed is higher than the engine speed threshold, in step S334, the TCU 50 determines whether the engine speed signal is normal. If so, the method proceeds to step S318 and continues as previously discussed.

If it is determined that the output shaft speed sensor has failed, the TCU 50 performs a predetermined shift control for the predetermined period. That is, if a downshift criterion exists, the TCU 50 maintains the current gear without downshifting, and if an upshift criterion exists, the TCU 50 upshifts the gear into one gear higher.

Moreover, if the criterion for a failure of the output shaft speed sensor and the criterion for the shift restriction are satisfied, the TCU 50 stops the progress of the predetermined period and stores the conditions, if the conditions continuously exist for 1 second. In general, "shift restriction control" means to control the transmission to prevent a shift caused by the output of a malfunctioning output shaft speed sensor. Specific examples of shift restriction control are shown in FIG. 2 at steps S224, S226, and S228, and in FIG. 1 at steps S116, S118, and S120.

If the output shaft speed sensor is determined to have failed more than a threshold number of times (for example, 4 times), the TCU 50 controls to operate in a fail-safe mode in which the gear is held at a predetermined gear. For example, the TCU 50 controls to operate in the fail-safe mode of third gear when it determines a failure of the output shaft speed sensor in drive (D), fourth gear (4), or third gear (3), and to operate in the fail-safe mode of second gear when it determines a failure of the output shaft speed sensor in second gear (2) and neutral (N).

As described above, a preferred embodiment of the present invention may improve driveability by implementing the shift restriction logic after diagnosing a failure of the output shaft speed sensor. The diagnosis may compare the output shaft speed sensor to the input shaft speed sensor. The diagnosis may also be based on the angular acceleration value (dNo/dt) of the output shaft speed sensor. In addition, the diagnosis may compare the output shaft speed sensor signal to an engine speed sensor signal.

Particularly, a preferred embodiment of the present invention may prevent a misdiagnosis during a stall by setting the engine speed threshold according to the respective gear, and still diagnose a failure even below the stall engine speed in first, second, third, and fourth gear. Additionally, an embodiment is able to diagnose the failure of the output shaft speed sensor in spite of a failure of the input shaft speed sensor.

As described above, a method for diagnosing the failure of the output shaft speed sensor of an automatic transmission according to a preferred embodiment of the present invention may prevent misdiagnosing a failure of an output shaft speed sensor, and improve the vehicle performance in spite of a concurrent failure of the input shaft speed sensor and the output shaft speed sensor.

Although preferred embodiments of the present invention have been described in detail hereinabove, it should be clearly understood that many variations and/or modifications of the basic inventive concepts herein taught, which may appear to those of ordinary skill in the art, will still fall within the sprit and scope of the present invention, as defined in the appended claims.

What is claimed is:

1. A method for diagnosing a failure of an output shaft speed sensor of an automatic transmission, comprising:

determining whether the transmission is in a forward gear;

determining whether a failure criterion exists based on at least one of a current gear, an input shaft speed, an output shaft speed, or an engine speed, if the transmission is in a forward gear; and maintaining the current gear if a downshift criterion exists, or upshifting a gear if an upshift criterion exists, if the failure criterion exists, wherein if the determined forward gear is first gear or second gear, the failure criterion comprises at least one of:

(1) a lapse of a predetermined period after shifting from neutral to drive and a turbine shaft speed greater than a turbine shaft speed threshold and no signal from the output shaft speed sensor; and (2) a lapse of a predetermined period after shifting from neutral to drive and an engine speed greater than a engine speed threshold and a normal engine speed sensor signal and no signal from the output shaft speed sensor.

2. The method of claim 1, wherein the engine speed threshold is greater than an engine stall speed in first gear.

3. A method for diagnosing a failure of an output shaft speed sensor of an automatic transmission, comprising:

determining whether the transmission is in a forward gear;

determining whether a failure criterion exists based on at least one of a current gear, an input shaft speed, an output shaft speed, or an engine speed, if the transmission is in a forward gear; and maintaining the current gear if a downshift criterion exists, or upshifting a gear if an upshift criterion exists, if the failure criterion exists, wherein if the determined forward gear is first gear or second gear, the failure criterion comprises at least one of:

(1) a lapse of a predetermined period after shifting from neutral to drive and a turbine shaft speed greater than a turbine shaft speed threshold and no signal from the output shaft speed sensor; and (2) a lapse of a predetermined period after shifting from neutral to drive and an engine speed greater than a engine speed threshold and a normal engine speed sensor signal and no signal from the output shaft speed sensor and, wherein if the transmission is determined to be in third gear, fourth gear, or fifth gear, the failure criterion comprises at least one of:
  (1) completion of shifting from neutral to drive, and a turbine shaft speed greater than a turbine shaft speed threshold, and no signal from the output shaft speed sensor; and
  (2) completion of shifting from neutral to drive, and an engine speed greater than an engine speed threshold, and a normal engine speed sensor signal, and no signal from the output shaft speed sensor.

4. The method of claim 3, wherein the engine speed threshold is less than an engine stall speed in first gear.

5. A method for diagnosing a failure of an output shaft speed sensor of an automatic transmission, comprising:
  determining whether the transmission is in a forward gear;
  determining whether a failure criterion exists based on at least one of a current gear, an input shaft speed, an output shaft speed, or an engine speed, if the transmission is in a forward gear; and
maintaining the current gear if a downshift criterion exists, or upshifting a wear if an upshift criterion exists, if the failure criterion exists,
  wherein if the determined forward gear is first gear or second gear, the failure criterion comprises at least one of:
  (1) a lapse of a predetermined period after shifting from neutral to drive and a turbine shaft speed greater than a turbine shaft speed threshold and no signal from the output shaft speed sensor; and
  (2) a lapse of a predetermined period after shifting from neutral to drive and an engine speed greater than a engine speed threshold and a normal engine speed sensor signal and no signal from the output shaft speed sensor,
  wherein if the transmission is determined to be in third gear, fourth gear, or fifth gear, the failure criterion comprises at least one of:
  (1) completion of shifting from neutral to drive, and a turbine shaft speed greater than a turbine shaft speed threshold, and no signal from the output shaft speed sensor; and
  (2) completion of shifting from neutral to drive, and an engine speed greater than an engine speed threshold, and a normal engine speed sensor signal, and no signal from the output shaft speed sensor and,
  wherein the upshift criterion comprises at least one of:
  (1) an engine speed greater than an engine speed threshold, and an angular acceleration of the engine greater than 0; and
  (2) a turbine shaft speed greater than a turbine shaft speed threshold, and an angular acceleration of the turbine shaft greater than 0.

6. A method for diagnosing a failure of an output shaft speed sensor of an automatic transmission, comprising:
  (a) determining whether the transmission is in a forward gear;
  (b) determining whether a failure criterion exists based on at least one of a current gear, an input shaft speed, an output shaft speed, or an engine speed, if the transmission is in a forward gear;
  (c) maintaining the current gear if a downshift criterion exists, or upshifting a gear if an upshift criterion exists, if the failure criterion exists,
  wherein if the determined forward gear is first gear or second gear, the failure criterion comprises at least one of:
  (1) a lapse of a predetermined period after shifting from neutral to drive and a turbine shaft speed greater than a turbine shaft speed threshold and no signal from the output shaft speed sensor; and
  (2) a lapse of a predetermined period after shifting from neutral to drive and an engine speed greater than a engine speed threshold and a normal engine speed sensor signal and no signal from the output shaft speed sensor,
  wherein if the transmission is determined to be in third gear, fourth gear, or fifth gear, the failure criterion comprises at least one of:
  (1) completion of shifting from neutral to drive, and a turbine shaft speed greater than a turbine shaft speed threshold, and no signal from the output shaft speed sensor; and
  (2) completion of shifting from neutral to drive, and an engine speed greater than an engine speed threshold, and a normal engine speed sensor signal, and no signal from the output shaft speed sensor and,
  wherein the upshift criterion comprises at least one of:
  (1) an engine speed greater than an engine speed threshold, and an angular acceleration of the engine greater than 0; and
  (2) a turbine shaft speed greater than a turbine shaft speed threshold, and an angular acceleration of the turbine shaft greater that 0, further comprising:
  (d) determining whether a shift restriction criterion exists;
  (e) determining whether the transmission is in a forward gear, if it is determined that the shift restriction criterion exists; and
  (f) maintaining a current gear if a downshift criterion exists, or upshifting a gear if a upshift criterion exists, for a shift restriction period, if the transmission is in a forward gear.

7. The method of claim 6, further comprising
  determining that the output shaft speed sensor has failed based on the failure criterion existing.

8. The method of claim 7, wherein the determining whether a failure criterion exists is further based on an engine speed.

9. The method of claim 6, wherein the shift restriction criterion comprises that a turbine shaft speed is higher than a turbine shaft speed threshold, and an angular acceleration of the output shaft is less than a angular acceleration threshold.

10. The method of claim 6, further comprising shifting a transmission into third gear if a neutral gear or a parking gear is detected during the shift restriction period.

11. The method of claim 6, further comprising:
  determining whether the transmission is neutral or park, if it is determined that the transmission is not in a forward gear; and
  shifting the transmission into a third gear of a neutral range, if the current gear is neutral or park.

12. The method of claim 6, wherein the upshift criterion comprises:
  (1) an engine speed greater than an engine speed threshold and an angular acceleration of the engine greater than 0; and
  (2) a turbine shaft speed greater than a turbine shaft speed threshold, and an angular acceleration of the turbine shaft greater than 0.

13. The method of claim 6, wherein if shifting is in progress when the shift restriction criterion exists, the shift restriction period starts after the completion of the progressing shift.

14. The method of claim 9, wherein the shift restriction criterion further comprises that a current shift mode is neither an extremely low temperature mode nor a fail-safe mode.

15. The method of claim 11, further comprising shifting the transmission into third gear if the transmission is shifted into a forward gear.

16. A system for diagnosing a failure of an output shaft speed sensor of an automatic transmission, comprising:
   an inhibitor switch for detecting what gear the transmission is in;
   an input shaft speed sensor detecting a turbine shaft speed and generating a corresponding signal;
   an output shaft speed sensor detecting an output shaft speed and generating a corresponding signal;
   an engine speed sensor detecting an engine speed and generating a corresponding signal; and
   a control unit programmed to execute instructions comprising:
   determining whether the transmission is in a forward gear;
   determining whether a failure criterion exists based on a current gear, an input shaft speed, an output shaft speed, and an engine speed, if the transmission is in a forward gear; and
   maintaining the current gear if a downshift criterion exists, or upshifting a gear if a upshift criterion exists, if the failure criterion exists.

17. The system of claim 16, wherein if the determined forward gear is first gear or second gear, the failure criterion comprises at least one of:
   (1) a lapse of a predetermined period after shifting from neutral to drive and a turbine shaft speed greater than a turbine shaft speed threshold, and no signal from the output shaft speed sensor; and
   (2) a lapse of a predetermined period after shifting from neutral to drive and an engine speed greater than an engine speed threshold and a normal engine speed sensor signal, and no signal from the output shaft speed sensor.

18. The system of claim 17, wherein the engine speed threshold is higher than an engine stall speed in a first gear.

19. The system of claim 16, wherein if the determined current gear is third gear, fourth gear, or fifth gear, the failure criterion comprises at least one of:
   (1) completion of shifting from neutral to drive, and a turbine shaft speed greater than a turbine shaft speed threshold, and no signal from the output shaft speed sensor; and
   (2) completion of shifting from neutral to drive, and an engine speed greater than an engine speed threshold and a normal engine speed sensor signal, and no signal from the output shaft speed sensor.

20. The system of claim 19, wherein the engine speed threshold is less than an engine stall speed in first gear.

21. The system of claim 16, wherein the upshift criterion comprises at one of:
   (1) an engine speed greater than an engine speed threshold, and an angular acceleration of the engine greater than 0; and
   (2) a turbine shaft speed greater than a turbine shaft speed threshold and an angular acceleration of a turbine shaft greater than 0.

22. The system of claim 16, wherein the diagnostic control further comprises a shift restriction control comprising:
   determining whether a shift restriction criterion exists;
   determining whether the transmission is in a forward gear, if it is determined that the shift restriction criterion exists; and
   maintaining the current gear if a downshift criterion exists, or upshifting a gear if a upshift criterion exists, for a shift restriction period, if the transmission is in a forward gear.

23. The system of claim 22, wherein the shift restriction criterion comprises that a turbine shaft speed is higher than a turbine shaft speed threshold, and an angular acceleration of the output shaft is less than a angular acceleration threshold.

24. The system of claim 23, wherein the shift restriction criterion further comprises that a current shift mode is neither an extremely low temperature mode nor a fail-safe mode.

25. The system of claim 22, wherein the shift restriction control further comprises shifting a transmission into third gear if neutral or park is detected during the shift restriction period.

26. The system of claim 22, wherein the shift restriction control further comprises:
   determining whether the current gear is neutral or park, if it is determined that the current transmission is not a forward gear; and
   shifting the transmission into a third gear of a neutral range, if the current gear is neutral or park.

27. The system of claim 26, wherein the shift restriction control further comprises shifting the transmission into third gear if the transmission is shifted into drive.

28. The system of claim 22, wherein the upshift criterion of the shift restriction control comprises:
   (1) an engine speed greater than an engine speed threshold, and an angular acceleration of the engine greater than 0; and
   (2) a turbine shaft speed greater than a turbine shaft speed and an angular acceleration of a turbine shaft greater than 0.

29. The system of claim 22, wherein if shifting is in progress when the shift restriction criterion exists, the shift restriction period starts after the completion of the progressing shift.

* * * * *